US005748220A

United States Patent [19]

Garcia et al.

[11] Patent Number: 5,748,220

[45] Date of Patent: May 5, 1998

[54] THERMAL LINE-PRINTER HEAD

[75] Inventors: Salvador Garcia, Argenteuil; Patrick Vegeais, Paris; Alain Frederic, Cergy, all of France

[73] Assignee: Societe d'Applications Generales d'Electricite, France

[21] Appl. No.: 285,949

[22] Filed: Aug. 4, 1994

[30] Foreign Application Priority Data

Aug. 4, 1993 [FR] France .................................... 93 09611

[51] Int. Cl.[6] ............................ B41J 2/355; H04N 1/024

[52] U.S. Cl. ............................................................ 347/181

[58] Field of Search .................................... 347/180, 181, 347/182, 237, 211; 358/486

[56] References Cited

U.S. PATENT DOCUMENTS

| | | | |
|---|---|---|---|
| 4,327,381 | 4/1982 | Amicel | 358/486 |
| 4,746,941 | 5/1988 | Pham et al. | 347/237 |
| 4,893,133 | 1/1990 | Ohmori et al. | 347/182 |

FOREIGN PATENT DOCUMENTS

| | | |
|---|---|---|
| 2459591 | 1/1981 | France . |

OTHER PUBLICATIONS

English Translation of Patent Abstracts ofJapan, vol. 12, No. 260 (M-720), 21 Jul. 1988 & JP-A-63 042 874 (Fujitsu LTD.).

English Translations of Patent Abstracts of Japan, vol. 9, No. 172 (M-397) (1895), 17 Jul. 1985 & JP-A-60 044 371 (RICOH KK).

English Translation of Patent Abstracts ofJapan, vol. 8, No. 12 (M-269) (1449) 19 Jan. 1984 & JP-A58 175 677 (Tokyo Shibaura Denki KK.).

*Primary Examiner*—Benjamin R. Fuller
*Assistant Examiner*—L. Anderson
*Attorney, Agent, or Firm*—Graham & James LLP

[57] ABSTRACT

Line head thermal printing apparatus including a plurality of printing heating elements (2) designed to print, under the control of individual activation elements (7, 8) and by means of memory points (6; 46) of a printing register (5; 45), successive lines of points on a medium to be printed which is driven in advance against the head (1), which apparatus includes elements (10; 40) for individual write addressing of the memory points (6; 46).

8 Claims, 4 Drawing Sheets

THERMAL LINE-PRINTER HEAD

BACKGROUND OF THE INVENTION

1. Field of the Invention

The present invention relates to a thermal head for line-printing apparatus such as a facsimile machine or even a simple printer, for example.

2. Discussion of Related Art

A thermal line-printing head is used for printing almost simultaneously all the points in a line, which makes high-speed printing possible.

For example, when used in a facsimile machine, the head includes a large number of heating elements which carry out thermal printing under the control of an equal number of activation bits. These bits are stored in a shift register having an equal number of outputs which individually control the heating elements, while a line is being printed. Thus the points in the line may be printed simultaneously in response to the activation bits.

Since simultaneous printing of a large number of points would generate a current flow which would exceed the allowed power supply rating of the facsimile machine, the register controlling the heating elements is logically divided into blocks which are activated one after another in order to print line segments or portions which together constitute the line to be printed.

Such an arrangement commensurately multiplies the printing time of a line, which is detrimental to the aim in question, namely to obtain high-speed line printing.

The present invention aims to increase this printing speed.

SUMMARY OF THE INVENTION

For this purpose, it relates to line head thermal printing apparatus including a plurality of printing heating elements designed to print, under the control of individual activation means and by means of memory points of a printing register, successive lines of points on a medium to be printed which is driven in advance against the head, which apparatus includes means for individual write addressing of the memory points.

It is thus possible, when the number of points to be printed on a line is limited, simultaneously to print all the points, while, in the prior art, a fixed duration was reserved for each control block, even if it contained only a single point to be printed. It will further be noted that, in the event that an excessive number of points is to be printed, the supply of individual control signals which activate the printing elements can be provisionally suspended until other heating elements become inactive.

In addition, the heating duration of each heating element can be modulated, that is to say that the head makes it possible to reconstruct black points whose size depends on this duration and which appear, with their periphery remaining blank, as grays with adjustable intensity.

In order to minimize the number of addressing links, it is preferable for the write addressing means to include a demultiplexer for addressing the memory points.

In order to make it possible to print black points with a size less than that of a pixel (image element), equivalent to grays, the apparatus may include control means for the write addressing means, designed to receive as input signals respectively representing gray intensities of the points to be printed. However, for the same purpose, the addressing and activation control means may be designed to simultaneously manage the heating duration settings of several printing elements.

BRIEF DESCRIPTION OF THE DRAWINGS

The invention will be better understood with the aid of the following description of two preferred embodiments of the line head thermal printing apparatus of the invention, with reference to the attached drawing, in which.

DETAILED DESCRIPTION OF THE PREFERRED EMBODIMENTS

Figure 1:
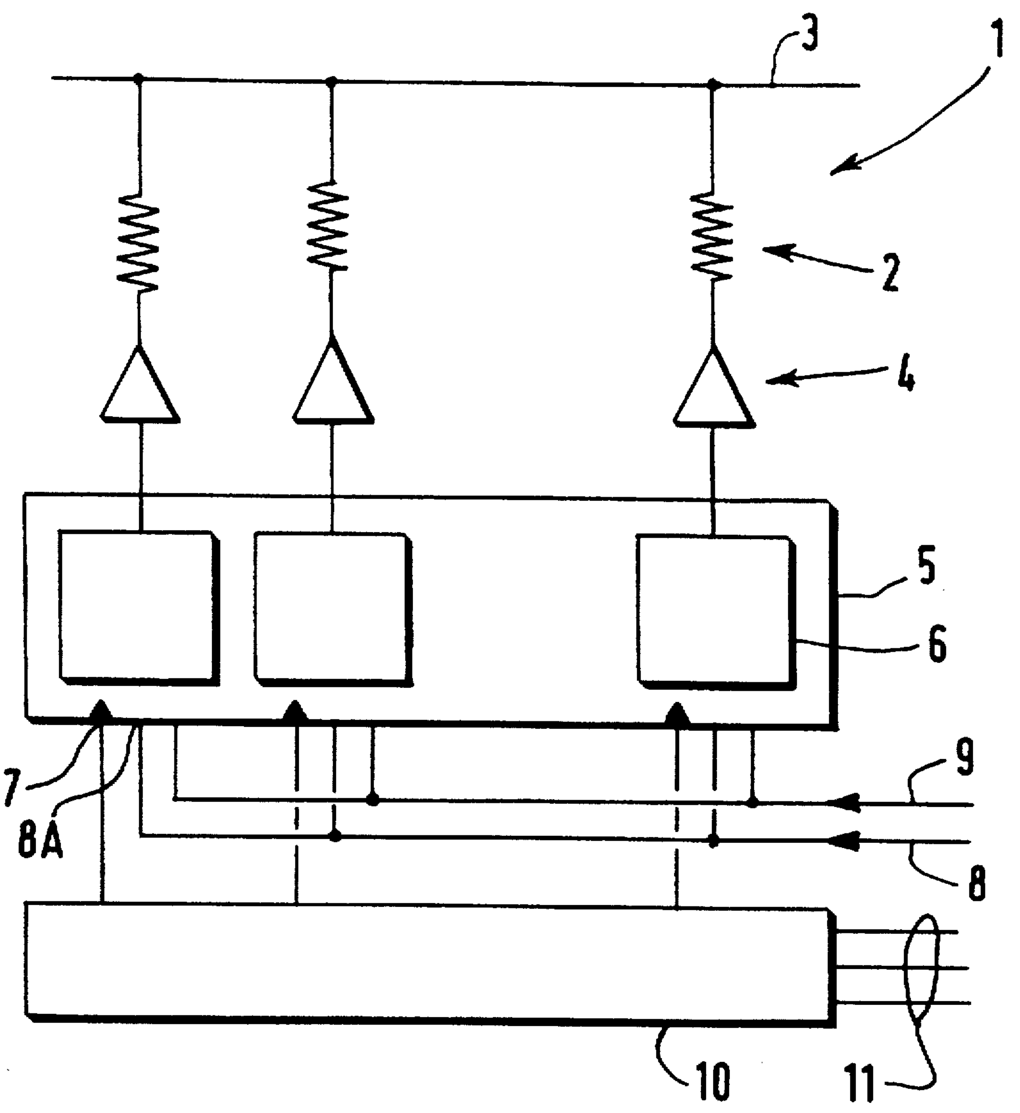
FIG. 1 is a block diagram of the printing head in the first embodiment.
Figures 2A, 2B, 2C, 2D, 2E:
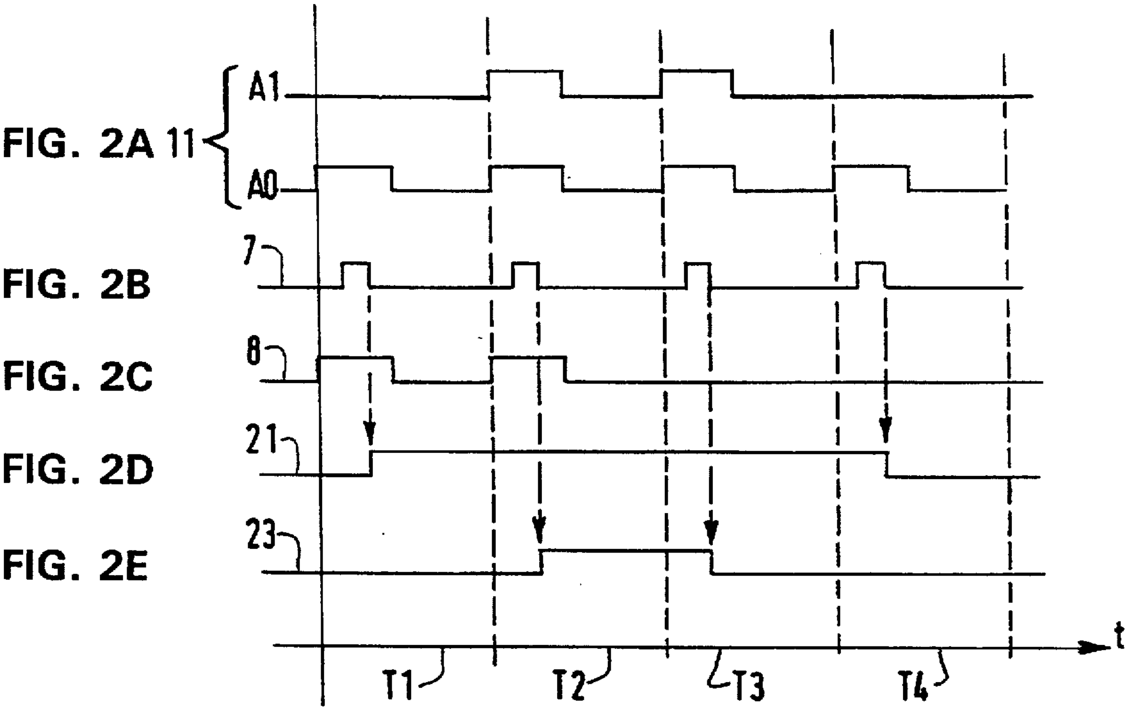
FIGS. 2A–2E are diagrams of the times of control signals of the printing head in FIG. 1.

The thermal printing apparatus of the invention includes, in its first embodiment, a thermal head 1 represented in FIG. 1, of which a row of 1728 printing heating elements, given the overall reference 2, interacts with a thermal-transfer printing inking ribbon, not shown, applied onto a medium to be printed consisting of paper and driven in advance against the head 1. The printing elements 2 are connected to a +24 volts supply line 3 and are controlled by individual amplifiers/switches 4 each controlled by an individual activation bit stored in a memory point 6, here of the "D"-type flip-flop, of a printing buffer register 5 with parallel inputs and outputs including an ordered array of 1728 such memory points 6. A demultiplexer circuit 10 includes eleven address inputs, referenced 11, and 1728 outputs respectively connected to 1728 clock inputs belonging respectively to the 1728 memory points 6.

The 1728 memory points 6 respectively include 1728 data bit inputs 8A connected to a common link 8. An input 9 is here provided, connected to all the memory points 6, allowing simultaneous resetting of them all, that is to say forcing them into one and the same predetermined state, here a logic level 0 referred to as inactive, for which the heating elements 2 are not supplied with current through the amplifiers 4.

The "D" flip-flops of the memory points 6 may, for example, be made by means of integrated circuits in TTL or CMOS technology, of type 7474, while the demultiplexer 10 may similarly be made by means of several integrated circuits of type 74154 or 74HC154 and with a logic for selecting a single one of them, acting on an address input then used as validation input, the corresponding outputs of the 74(HC)154 circuit being then unused. It would have been possible to provide flip-flops of type JK, dividing by two, and not "D" flip-flops, which would have avoided the necessity of the data link 8 since each addressing of such a divider flip-flop would be sufficient to make it change state.

The above integrated circuits are available from the companies TEXAS INSTRUMENTS INC. or MOTOROLA, INC.

In order to command the activation of a heating element 2, a corresponding address in the row is applied briefly to the address inputs 11, the link 8 having previously been set to the logic level 1 (see FIGS. 2A–2E). The output of the demultiplexer 10 which is connected to the clock input 7 of the memory-point 6 of the heating element 2 in question supplies a pulse for the duration of application of the address to the address inputs 11, which has the effect of opening a gate, not shown, for individual activation of a heating element 2, which reads the logic level of the data link 8 and commands the storage, in the memory point 6 in question, of a bit having the logic level 1 present on the data link 8.

The deactivation of a memory point 6 takes place in similar manner, the link 8 being then set to the logic level 0.

The bit contained in each memory point 6 is thus an activation bit for the heating elements 2, which can have two states, namely an active state, here the logic level 1, and an inactive state, here the logic level 0.

Thus, in FIGS. 2A–2E, which are temporal diagrams of the above signals, the memory point 6 with address "one" is addressed briefly within a period T1 of a sequence T1 (1 integer=1 to P), by setting to 1 the least significant address bit A0 applied to the address inputs 11, the other bits, not all shown, being at the level 0, which generates a pulse on the clock input 7 of the memory point 6 with address "one", the logic level, or state, of which is represented by the signal 21.

During the following period T2, another memory point 6, here with address "three", is addressed, the two least-significant address bits, A0 and A1, passing to the level 1 to provide the binary address 11, or three in decimal. The signal 23 represents the logic level of the bit contained in the memory point with address "three". The initial states of the memory points 6 have here been assumed to be the state 0.

In this example, the memory point with address "three" returns to 0 during the period T3, while the memory point with address "one" returns to 0 in period T4. Simultaneous, or interlaced, management of several memory points 6 is thus produced by virtue of the distribution of the time t into segments or periods T1.

It will be understood that, for the purpose of clarity, the control pulses appearing from one period T1–T4 to the other return to the state 0, while in practice the data link 8 remains at the same level during each period T1–T4 and is read, by sampling, by an active edge, here falling, of the clock signal 7. Because of this, the periods T1–T4 are limited to a few tens of nanoseconds, which makes it possible to control all the memory points 6 in a time much less than the 10 milliseconds provided by the standards for printing a line.

The activation duration of each heating element 2 can thus be regulated by sending an activation command followed, after the desired duration, by the sending of a deactivation command which returns the activation bit to 0. It will be noted that the resetting link 9 makes it possible, if so desired, to simplify the sending of the commands of the register 5, by providing simultaneous deactivation of all the activation bits, their activation instant being determined accordingly. It would, similarly, have been possible to provide for the amplifiers 4 or the memory points 6 to be inverters, or alternatively for the link 9 to allow all the bits of the printing register 5 to be forced to 1. In this case, all the bits of the printing register 5 could be simultaneously set in the active state at the start of printing a line, on condition that they be individually deactivated almost instantaneously if they correspond to blank points or, if not, after the desired printing duration.

The regulation of the activation time of the heating elements 2 makes it possible to choose the temperature which they reach, as well as the time of the thermal diffusion to the ink and the transfer time when the ink has melted.

Because of this, the regulation of the activation duration makes it possible to modulate the quantity of ink deposited on the paper at each point, that is to say to obtain black points of reduced size, each surrounded by a remaining blank zone, which simulates grays with independent intensities from one point to another.

Figure 3:
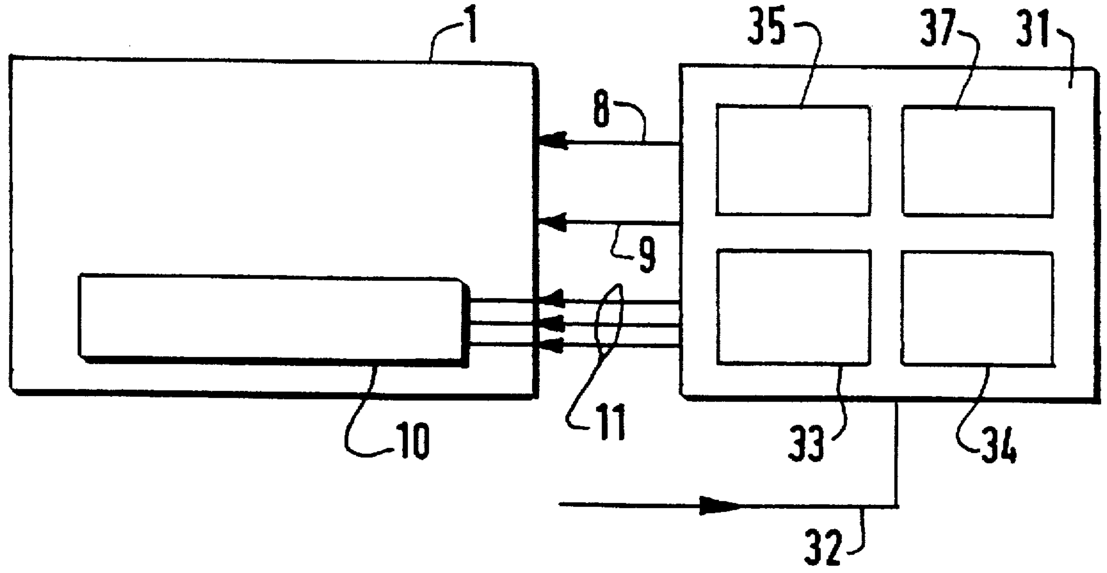
FIG. 3 is a block diagram of the above printing head and of control logic for this head.

The circuit 31 in FIG. 3 controls the demultiplexer 10 by emitting the desired addresses at the appropriate time. For this purpose, a reception link 32 supplies a sequence of binary signals representing numbers, coded in this example, ranked according to the order of the points to be printed, respectively representing gray intensities of the points of a line to be printed.

In this example, each number is proportional to the desired gray intensity, the number "zero" indicating the presence of a blank point and the coding corresponding to the conventional binary coding. The circuit 31 stores this sequence of numbers in a shift register 33 with parallel outputs then reads them successively in a partial scanning cycle using a multiplexer 34 addressed by a counter 35 incrementing at the rate of a timebase 39 with period T1, until finding a number different from zero, indicating a gray to be printed. The address of the counter 35, which corresponds to the relative position of the number in the row, that is to say the position or address of the memory point 6 in question, is applied to the address inputs 11 of the demultiplexer 10, while the link 8 is set to the level 1 by the circuit 31, in order to activate the corresponding memory point 6, as explained hereinabove. The procedure is continued until the last number. The activation instants of the memory points 6, supplied by the timebase 39, could be memorized with each number of the register 33 but, in this case, since they are very close together, only the instant TA of the last activation is noted.

For deactivating the heating elements 6, the multiplexer 34 executes partial scanning cycles of the register 33 and an arithmetic circuit 37 of the circuit 31 subtracts the value TA stored from the value tj of the current instant, supplied by the timebase 39, and compares the result with the corresponding coded number of the register 33. In the event that this number is reached or exceeded, a deactivation command is emitted, as explained hereinabove.

Figure 4:
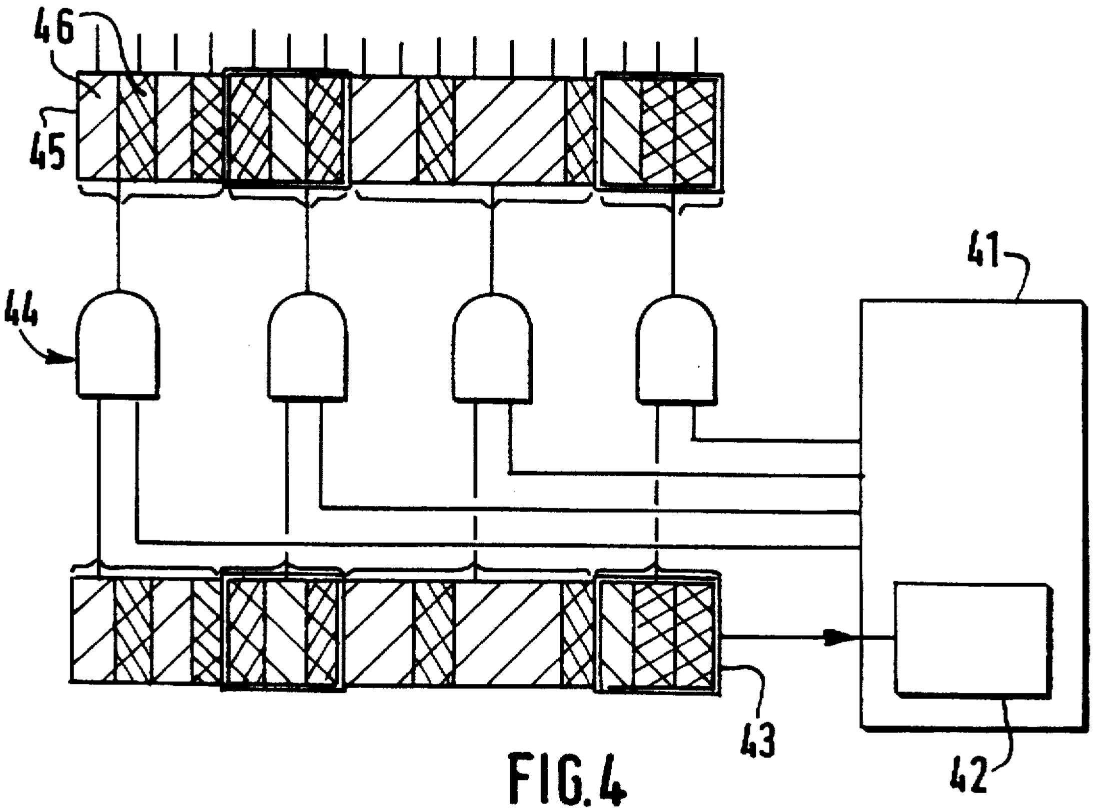
FIG. 4 is a block diagram of the second embodiment.

In the second embodiment, schematically represented in FIG. 4, a printing register 45, controlling the heating elements in the same manner as the register 5 in the preceding example, includes 1728 data inputs for memory points 46 which, through gates 44, are connected to as many outputs of an input register 43 containing, like the register 33, a sequence of binary signals representing stored numbers, themselves also coded in this example, respectively representing gray intensities of the points of a line to be printed.

A control circuit 41 is connected by means of a read circuit 42 of the circuit 41 to the input register 43 and controls the opening of a determined number of gates 44, of determined position, this number of gates being a function of the coded numbers read from the register 43, as explained further on.

The hatched zones indicate blocks of bits transferred simultaneously, the position of the hatched zones of the register 43 corresponding to that of the hatched zones of the printing register 45, the presence of numbers different from zero, indicating grays, being marked by doubly hatched blocks. A bit with the same address in the printing register 45 therefore corresponds to a coded number.

Figure 5:
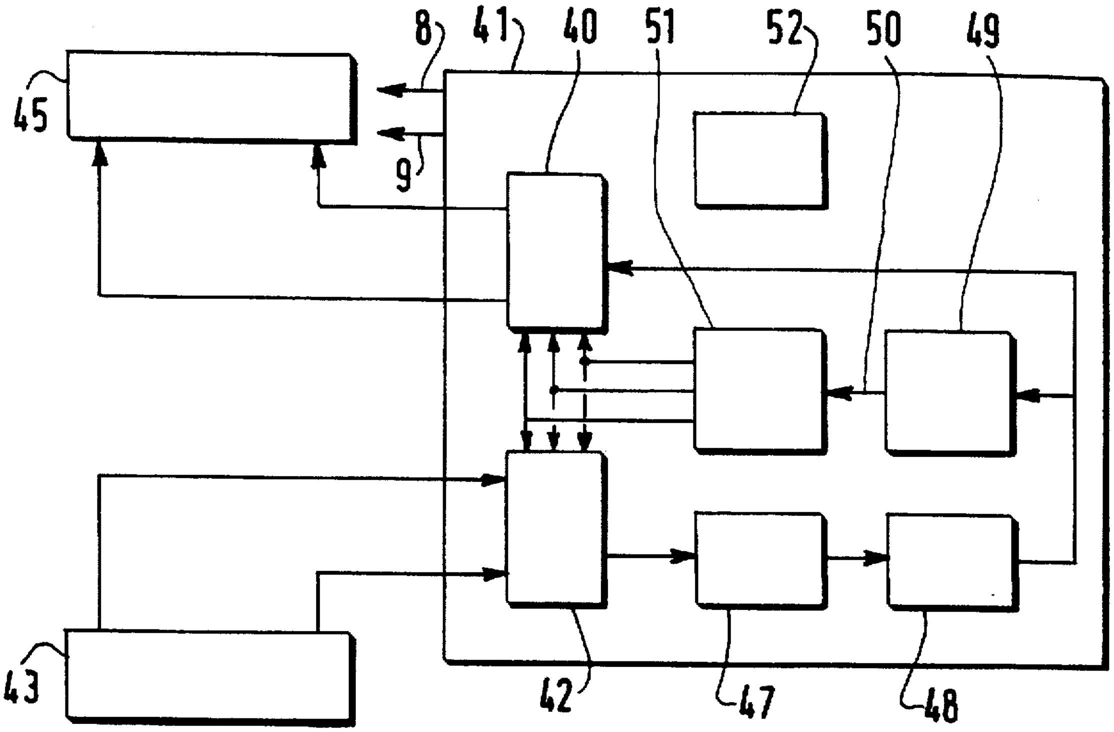
FIG. 5 is a more detailed diagram than that in FIG. 4.

FIG. 5 shows the diagram of FIG. 4 in more detail. The read circuit 42 is a multiplexer connected to the M outputs of the input register 43, with M=1728 times the number of bits of each coded number.

Since the numbers of the register 43 are coded in this example, the output of the multiplexer 42 is connected to a transcoder circuit 47 which converts each coded number received into another number, not coded, of predetermined length, including bits for activation to the state 1 at the head, in a number proportional to the intensity of the gray defined by the corresponding coded number, these uncoded numbers being stored in a memory 48. For clarity, the memory 48 has not been represented in FIG. 4 and would therefore be interposed, with the transcoder circuit 47, between the outputs of the input register 43 and the gates 44.

Figure 6:
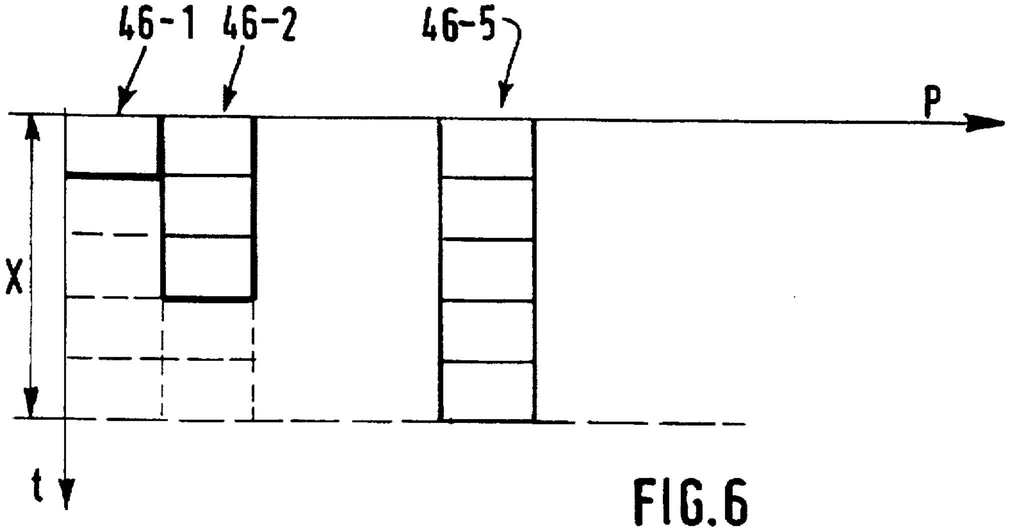
FIG. 6 illustrates the development, as a function of time t, of the state of activation memory points.

FIG. 6 represents three uncoded numbers, each with five bits, relating to three points 46-1, 46-2 and 46-5, the abscissa axis bearing the rank P of the memory points 46 and the ordinate axis bearing the time t. The point 46-1 has only one bit in state 1, so that the gray will be clear, while the point 46-2, having a number with three bits in state 1, will have a medium gray and the point 46-5, with 5 bits in state 1, will be black because it is activated for the maximum duration X provided.

The output of the memory 48 also controls on a counter 49 which detects the presence of activation bits in state 1 and emits a stop signal 50 when it reaches a predetermined value N. The signal 50 has the effect of stopping a common addressing counter 51 which drives the multiplexer 42 and a demultiplexer 40, equivalent to the demultiplexer 10, connected in output to the printing register 45.

After complete writing of the memory 48, a sequencer circuit 52 forces the counter 51 to a determined address value, with value "one" at the start, and starts a cycle of a sequence of reading the first bits of each uncoded word from the memory 48. If the bit read is in state "1", this "1" is recopied into the memory point 46 with the same address through the demultiplexer 40. After N such recopies, the counter 49 emits the stop signal 50, which stops any further sending of "1" to the printing register 45, and the address AS of the last memory point 6 in state 1 is stored by the circuit 52. The circuit 52 then resets the counter 49 to "one" in order to recommence a new cycle, relating to the second bits of the uncoded numbers in the memory 48 and then sends a command for deactivating the memory points 46 with address "one" to AS, for which the second bit of the uncoded number is in state 0, which is the case for the point 46-1.

Other following cycles, starting from the address "one", make it possible to process the following bits of the same uncoded numbers which, in the end, ensures deactivation of the heating elements 46 with address "one" to AS. Other such sequences of cycles, the first of which starts at the address AS+1, make it possible successively to control blocks of variable size (FIG. 4) including sets of N memory points 46 in the activated state, two of which are, as indicated, represented in each case in FIG. 4, separated by an arbitrary number of memory points 46 in the inactive state. The writing by the demultiplexer 40 is thus carried out under the control of the addressing means (42, 49) since it is the counter 49 which determines, by the stop signal 50, the extreme addresses of each block of bits.

After writing of the last black point of the line, the bits of the following line to be printed are read from the input register 43, in order to start a new printing.

We claim:

1. Line head (1) thermal printing apparatus including a plurality of printing heating elements (2) interactively connected to individual activation means (7, 8) and memory points (6; 46) in a printing register (5; 45) said printing heating elements being adapted to print, under control of the individual activation means (7, 8) and by means of the memory points (6; 46) of the printing register (5; 45) successive lines of points on a medium being printed which is driven in advance against the head (1), said apparatus includes means (10; 40) for individual write addressing of the memory points (6; 46).

2. The printing apparatus as claimed in claim 1, wherein the write-addressing means include a demultiplexer (10; 40) for addressing the memory points (6; 46).

3. The printing apparatus as claimed in claim 1, wherein the printing register (5; 45) includes a control input (9) for forcing the memory point (6) into a single predetermined state.

4. The printing apparatus as claimed in claim 1, wherein the write addressing means (10; 40) are interactively connected to control means (31; 41; 47, 48, 49, 51), with said control means being adapted to receive as input signals respectively representing gray intensities of the memory points being printed.

5. Printing apparatus as claimed in claim 4, wherein the addressing control means (31; 41) are further adapted to simultaneously manage heating duration settings of several printing elements (2).

6. The printing apparatus as claimed in claim 4, further comprising read addressing means (42, 49) and an input memory (43; 48) with the read addressing means being adapted to read, from the input memory (43; 48), a determined number of bits for activation to an active state of a line being printed, and wherein the control means (51; 52) of the write addressing means (40) are adapted to select said activation bits under the control of the read addressing means (42, 49) and for controlling the transfer of said activation bits from the input memory (43) to the printing register (45).

7. The printing apparatus as claimed in claim 6, wherein a counter (51) is provided for controlling both the read addressing means (42) and the write addressing means (40).

8. The printing apparatus as claimed in claim 1, further comprising control means (31) interactively connected to the write addressing means (10) for the control thereof and wherein the activation control means (7, 8) comprise a link (8) connected to the memory points (6) of the printing register (5).

* * * * *